United States Patent
Franz et al.

(10) Patent No.: US 6,928,448 B1
(45) Date of Patent: Aug. 9, 2005

(54) SYSTEM AND METHOD TO MATCH LINGUISTIC STRUCTURES USING THESAURUS INFORMATION

(75) Inventors: Alexander Franz, Palo Alto, CA (US); Keiko Horiguchi, Palo Alto, CA (US); Kazami Uchida, Mountain View, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/420,509

(22) Filed: Oct. 18, 1999

(51) Int. Cl.⁷ .............................................. G06F 17/30
(52) U.S. Cl. ............................ 707/102; 707/6; 707/10; 704/9
(58) Field of Search .................... 707/1–10, 100–104.1, 707/200–206; 704/9–10

(56) References Cited

U.S. PATENT DOCUMENTS

| | | |
|---|---|---|
| 4,905,138 A | 2/1990 | Bourne |
| 4,974,191 A | 11/1990 | Amirghodsi et al. ............ 704/8 |
| 5,033,087 A * | 7/1991 | Bahl et al. .................. 704/256 |
| 5,068,789 A | 11/1991 | van Vliembergen |
| 5,083,268 A | 1/1992 | Hemphill et al. |
| 5,088,038 A | 2/1992 | Tanaka et al. .................. 704/2 |
| 5,095,432 A | 3/1992 | Reed |
| 5,111,398 A | 5/1992 | Nunberg et al. |
| 5,418,717 A | 5/1995 | Su et al. ........................ 704/9 |
| 5,426,583 A | 6/1995 | Uribe-Echebarria Diaz De Mendibil .................. 704/9 |
| 5,510,981 A | 4/1996 | Berger et al. .................. 704/2 |
| 5,528,491 A | 6/1996 | Kuno et al. .................... 704/9 |
| 5,535,120 A | 7/1996 | Chong et al. .................. 704/3 |
| 5,642,519 A | 6/1997 | Martin |
| 5,644,775 A | 7/1997 | Thompson et al. |
| 5,659,765 A | 8/1997 | Nii ................................ 704/4 |
| 5,677,835 A | 10/1997 | Carbonell et al. ............. 704/8 |
| 5,680,511 A | 10/1997 | Baker et al. |
| 5,768,603 A | 6/1998 | Brown et al. .................. 704/9 |
| 5,799,268 A | 8/1998 | Boguraev ...................... 704/9 |
| 5,806,021 A | 9/1998 | Chen et al. .................... 704/9 |
| 5,864,788 A | 1/1999 | Kutsumi |
| 5,873,056 A | 2/1999 | Liddy et al. ................... 704/9 |
| 5,884,247 A | 3/1999 | Christy |
| 5,887,120 A * | 3/1999 | Wical .......................... 706/46 |
| 5,907,821 A | 5/1999 | Kaji et al. ..................... 704/4 |
| 5,966,686 A | 10/1999 | Heidorn et al. |
| 5,983,169 A | 11/1999 | Kozma .......................... 704/2 |
| 6,131,082 A | 10/2000 | Hargrave, III et al. |

(Continued)

FOREIGN PATENT DOCUMENTS

EP    0 805 403 A2    11/1997

OTHER PUBLICATIONS

International Search Report PCT/US00/28777, Jan. 31, 2001, 7 pgs.

(Continued)

*Primary Examiner*—Shahid Alam
*Assistant Examiner*—Jean Bolte Fleurantin
(74) *Attorney, Agent, or Firm*—Blakely, Sokoloff, Taylor & Zafman LLP

(57) ABSTRACT

A system and method for evaluating similarity among multiple data structures are provided. In one embodiment, a number of entries are created in a database and a relative entropy value corresponding to each entry is calculated. Each data structure is analyzed and at least one substructure is generated for each data structure as a result of the analysis. This at least one substructure pertaining to each data structure is matched to the entries in the database to obtain matching entries. Finally, a match value is generated using the relative entropy values corresponding to the matching entries.

88 Claims, 8 Drawing Sheets

U.S. PATENT DOCUMENTS

| | | | |
|---|---|---|---|
| 6,161,083 A | 12/2000 | Franz et al. .................... | 704/4 |
| 6,173,441 B1 | 1/2001 | Klein | |
| 6,212,500 B1 * | 4/2001 | Kohler ....................... | 704/256 |
| 6,230,153 B1 * | 5/2001 | Howard et al. ................ | 707/2 |
| 6,243,669 B1 * | 6/2001 | Horiguchi et al. ............. | 704/9 |
| 6,260,008 B1 * | 7/2001 | Sanfilippo ..................... | 704/9 |
| 6,285,978 B1 | 9/2001 | Bernth et al. | |
| 6,285,995 B1 * | 9/2001 | Abdel-Mottaleb et al. ..... | 707/3 |
| 6,301,554 B1 | 10/2001 | Christy | |
| 6,330,530 B1 * | 12/2001 | Horiguchi et al. ............. | 704/4 |

OTHER PUBLICATIONS

International Search Report PCT/US00/28830, Jan. 29, 2001, 6 pgs.

PCT Search Report, International application No. PCT/US00/41256, filed Oct. 17, 2000.

S. Kurohashi, T. Nakamura, Y. Matsumoto, M. Nagao. Improvements of Japanese Morphological Analyzer JUMAN. In: "Proceedings of the International Workshop on Sharable Natural Language Resources", p. 22–28, Nara, Japan, 1994.

Kenneth W. Church, "A Stochastic Parts Program and Noun Phrase Parser for Unrestricted Text", in Proceedings of the Second Applied Natural Language Processing Conference, Austin, TX, 1988.

Edited by Karen Jensen, George E. Heidorn, Stephen D. Richardson, "Natural Language Processing: The PLNLP Approach", Kluwer Academic Publishers, 1993, 22 pages.

Stuart M. Shieber, An Introduction to Unification–based Approaches to Grammar, CSLI, 1986, 23 pages.

M. Tomita, T. Mitamura, H. Musha, M. Kee, "The Generalized LR Parser/Compiler Version 8.1: User's Guide", CMU–CMT–88–MEMO, Apr. 20, 1988, 44 pages.

M. Tomita, K. Knight, "Pseudo–Unification and Full–Unification", CMU, 1987, 10 pages.

M. Ishii, K. Ohta, H. Saito, "An Efficient Parser Generator for Natural Language", COLING 1994, 3 pages.

O. Furuse, H. Iida, "An Example–Based Method for Transfer–Driven Machine Translation", Proceedings of the Conference on Theoretical and Methodological Issues in Machine Translation (TMI–92), 1992, p. 139–150.

P. Resnik, "Using Information Content to Evaluate Semantic Similarity in a Taxonomy", Proceedings of the International Joint Conference on Artificial Intelligence (IJCAI–95), 1995.

T. C. Bell, J. G. Cleary, I. H. Witten, "Text Compression", Prentice Hall, 1990, 19 pages.

H. Maruyama, H. Watanabe, "Tree Cover Search Algorithm for Example–Based Translation", in Proceedings of the Fourth International Conference on Theoretical and Methodological Issues in Machine Translation (TMI–92), 1992, p. 173–184.

PCT Search Report, US00/41258, Feb. 22, 2001.

* cited by examiner

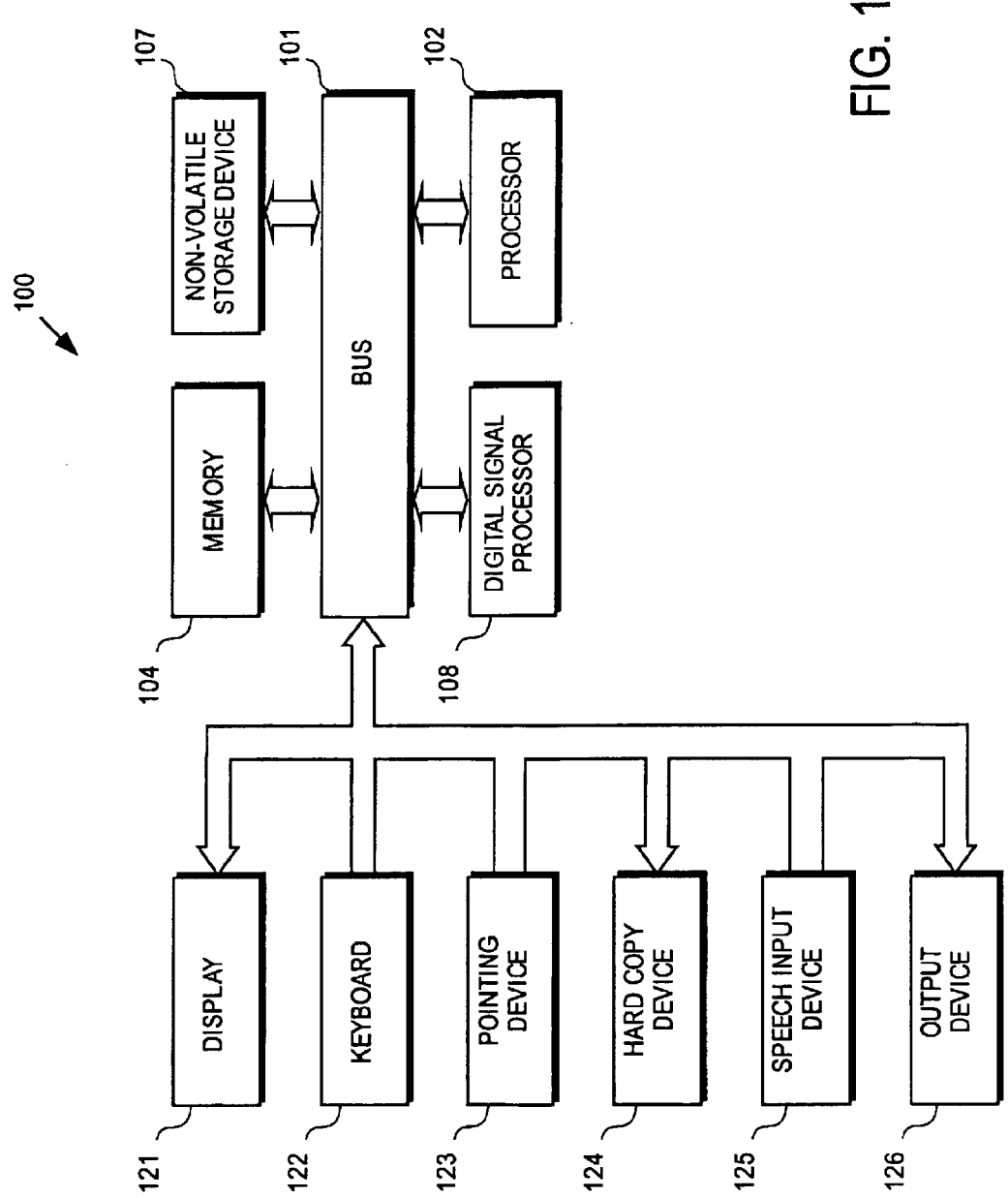

SYSTEM AND METHOD TO MATCH LINGUISTIC STRUCTURES USING THESAURUS INFORMATION

BACKGROUND OF THE INVENTION

With the continuing growth of multinational business dealings where the global economy brings together business people of all nationalities and with the ease and frequency of today's travel between countries, the demand for a machine-aided interpersonal communication system that provides accurate near real-time language translation is a compelling need. This system would relieve users of the need to possess specialized linguistic or translational knowledge.

A typical language translation system functions by using natural language processing. Natural language processing is generally concerned with the attempt to recognize a large pattern or sentence by decomposing it into small subpatterns according to linguistic rules. A natural language processing system uses considerable knowledge about the structure of the language, including what the words are, how words combine to form sentences, what the words mean, how word meanings are related to each other, and how word meanings contribute to sentence meanings. Specifically, phonetic and phonological knowledge concerns how words are related to sounds that realize them. Morphological knowledge concerns how words are constructed from more basic units called morphemes. Syntactic knowledge concerns how words can be put together to form correct sentences and determines what structural role each word plays in the sentence and what phrases are subparts of what other phrases. Typical syntactic representations of language are based on the notion of context-free grammars, which represent sentence structure in terms of what phrases are subparts of other phrases. This syntactic information is often presented in a tree form. Semantic knowledge concerns what words mean and the study of context-independent meaning—the meaning a sentence has regardless of the context in which it is used.

Natural language processing systems further comprise interpretation processes that map from one representation to the other. For instance, the process that maps a sentence to its syntactic structure is called parsing, and it is performed by a component called a parser. The parser uses knowledge about word and word meaning, the lexicon, and a set of rules defining the legal structures, the grammar, in order to assign a syntactic structure to an input sentence.

Formally, a context-free grammar of a language is a four-tuple comprising nonterminal vocabularies, terminal vocabularies, a finite set of production rules, and a starting symbol for all productions. The nonterminal and terminal vocabularies are disjoint. The set of terminal symbols is called the vocabulary of the language. Pragmatic knowledge concerns how sentences are used in different situations and how use affects the interpretation of the sentence.

Identified problems with previous approaches to natural language processing are numerous. One previous approach uses a thesaurus to calculate semantic distances between linguistic structures. The thesaurus has a fixed structure including four layers, wherein each layer is assumed to represent a fixed unit with a numeric value of ⅓. However, semantic links encoded in a thesaurus do not always represent the same semantic distance. As a result, this previous approach will sometimes yield erroneous values for semantic similarity. Furthermore, a thesaurus with such a fixed structure may not be readily available for all languages.

Another previous approach uses a negative log likelihood of the most informative thesaurus concept—log p(c)—to calculate semantic similarity between two words.

Therefore, what is required is a thesaurus that may be used with any language, making the natural language processing more efficient and accurate. Also, what is required is a method using such a thesaurus for evaluating similarity among words and phrases, and their linguistic representations.

SUMMARY OF THE INVENTION

A system and method for evaluating similarity among multiple data structures are provided. In one embodiment, a number of entries are created in a database and a relative entropy value corresponding to each entry is calculated. Each data structure is analyzed and at least one substructure is generated for each data structure as a result of the analysis. This at least one substructure pertaining to each data structure is matched to the entries in the database to obtain matching entries. Finally, a match value is generated using the relative entropy values corresponding to the matching entries.

BRIEF DESCRIPTION OF THE DRAWINGS

FIG. 1 is a block diagram of one embodiment for an architecture of a computer system.

FIGS. 2b, 2c, and 2d are exemplary diagrams of structures used by the natural language translation system of FIG. 2a.

DETAILED DESCRIPTION

Figure 2A:
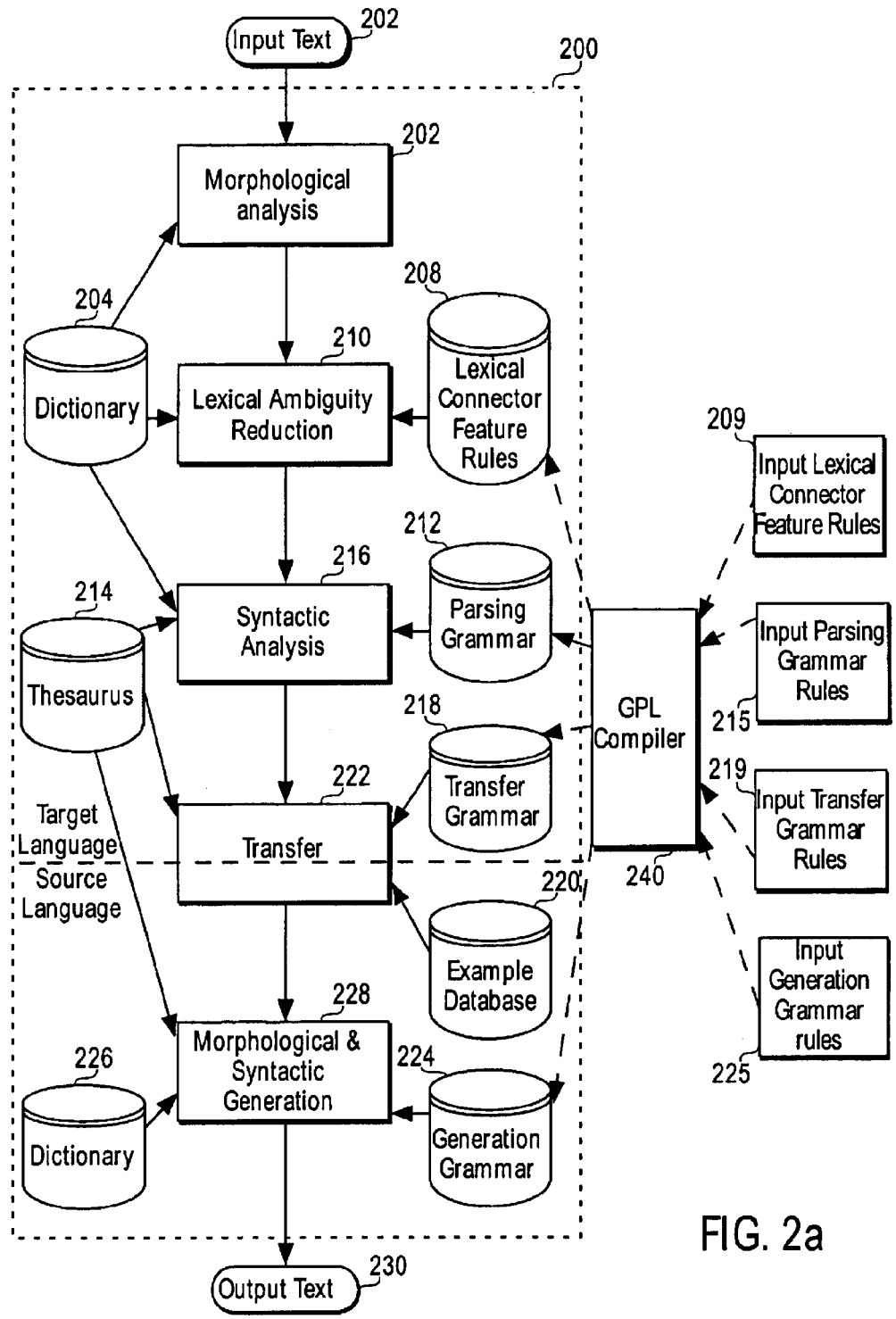
FIG. 2a is a block diagram of one embodiment for a natural language translation system.

A system and method for evaluating similarity among multiple data structures are described. In one embodiment, a system and method for evaluating similarity among a number of data structures, such as feature structures, are provided. Although the present invention relies on feature structures, it will be evident to one skilled in the art that any data structure may be used with the present invention.

In the following detailed description of embodiments of the invention, reference is made to the accompanying drawings in which like references indicate similar elements, and in which is shown by way of illustration specific embodiments in which the invention may be practiced. Numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention are described in terms of computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

FIG. 1 is a block diagram of one embodiment for an architecture of a computer system 100. Referring to FIG. 1, computer system 100 includes system bus 101 that allows for communication among processor 102, digital signal processor 108, memory 104, and non-volatile storage device 107. System bus 101 may also receive inputs from keyboard 122, pointing device 123, and speech signal input device 125. System bus 101 provides outputs to display device 121, hard copy device 124, and output device 126 (such as, for example, an audio speaker). Memory 104 may include, for example, read only memory (ROM), random access memory (RAM), flash memory, or any combination of the above.

It will be appreciated that computer system 100 may be controlled by operating system software which includes a file management system, such as, for example, a disk operating system, which is part of the operating system software. The file management system may be stored in non-volatile storage device 107 and may be configured to cause processor 102 to execute the various functions required by the operating system to input and output data and to store data in memory 104 and on non-volatile storage device 107.

FIG. 2a is a block diagram of one embodiment for a natural language translation system 200. Referring to FIG. 2a, natural language translation system 200 includes five modules, supporting databases, and associated grammars to quickly and accurately translate text between source and target languages. Input text may be directly input into natural language translation system 200 (for example, as with a person typing sentences into a computer using keyboard 122). Alternatively, input text to natural language translation system 200 may be the output of another system, such as, for example, output from a speech recognition system (for example, speech input device 125), or from an optical character recognition system (not shown).

An English sentence "He wants to go to the White House" is used throughout this section as example text input to describe the functioning of the system 200. The individual units in a sentence are referred to herein as "words" but the natural language translation system 200 is not limited to only word-based natural languages, having equal applicability to translation of character-based languages as well. Except where the differences in processing word-based and character-based languages are specified, the term "word" is intended to encompass both words and characters.

In the following description, a grammar is generally a set of context-free rules that define the valid phrase structures in the source or target language, with each context-free rule associated with one or more statements (the "rule body") that perform tests and manipulations on the linguistic representations (feature structures). Thus, an English sentence may be combined from a noun phase (NP) and a verb phrase (VP), but the subject and verb forms must agree, e.g., "He want to go to the White House" is a valid phrase structure but an improper English sentence. All rule bodies utilized by the grammars of language translation system 200 are in the form of computer-executable routines produced by defining the grammar in terms of a grammar programming language (GPL) and passing appropriate rule bodies (209, 215, 219, and 225) through a GPL compiler 240. The output of the GPL compiler 240 may be in the form of directly executable code, or may be in the form of standard computer programming language statements (such as, for example, C, C++, Pascal, or Lisp) which are then input into the corresponding programming language compiler to produce executable code. In either case, the compiled grammars include a specific function for each context-free rule. The specific function performs all the processing required by the rule and its associated rule body. Furthermore, the interfaces between the compiled grammars and the modules enable a single language translation system 200 to perform translation between multiple natural languages, and to perform more than one translation simultaneously.

A morphological analysis module 206 takes text input 202 and uses a source language dictionary 204 to decompose the words into morphemes by identifying root forms, grammatical categories, thesaurus information, and other lexical features of the words. The morphological analysis module 206 builds a "feature structure" for each word. Feature structures are well known in the art as linguistic data structures that contain feature-value pairs for strings, symbols, and numbers that appear in a natural language sentence. Each feature of a word is mapped to the appropriate value through a function commonly designated as:

word $\mapsto$ [feature:value]

Thus, a simplified, exemplary representation of the feature structures for the words "he" and "wants" are as follows:

$$h \mapsto \begin{bmatrix} \text{root: he} \\ \text{cat: pronoun} \end{bmatrix} \quad \text{(Feature Structure 1)}$$

$$\text{wants} \mapsto \begin{bmatrix} \begin{bmatrix} \text{root: want} \\ \text{cat: noun} \end{bmatrix} \\ \text{OR} \\ \begin{bmatrix} \text{root: want} \\ \text{cat: verb} \end{bmatrix} \end{bmatrix} \quad \text{(Feature Structure 2)}$$

The Feature Structure 2 may be referred to as a "disjunctive" feature structure as it represents two mutually exclusive feature structures that are valid for the word.

It will be appreciated that the grammatical category is not the only feature of these two words and that morphological analysis module 206 outputs full feature structures. The example feature structures are simplified for the sake of clarity in explanation and are also frequently represented by a shorthand notation, e.g., [want] or NP[ ].

The feature structures built by morphological analysis module 206 are input into lexical ambiguity reduction module 210. In one embodiment, lexical ambiguity reduction module 210 may segment the words in character-based languages that do not utilize spaces through a database of lexical connector feature rules 208. Lexical connector feature rules 208 are created from GPL grammar statements as described above. Each possible combination of adjacent segmented words are assigned a lexical cost. Dictionary 204 defines combinations of words ("multiwords"). Lexical ambiguity reduction module 210 evaluates each feature structures that contains a part-of-speech (POS) ambiguity, such as the feature structure for the word "wants" which is tagged as both a noun and a verb. The various possible POS tags are assigned a lexical cost. Lexical ambiguity reduction module 210 weighs the cost assigned to each word in the sentence and selects those feature structures that have the lowest cost.

Figure 2B:
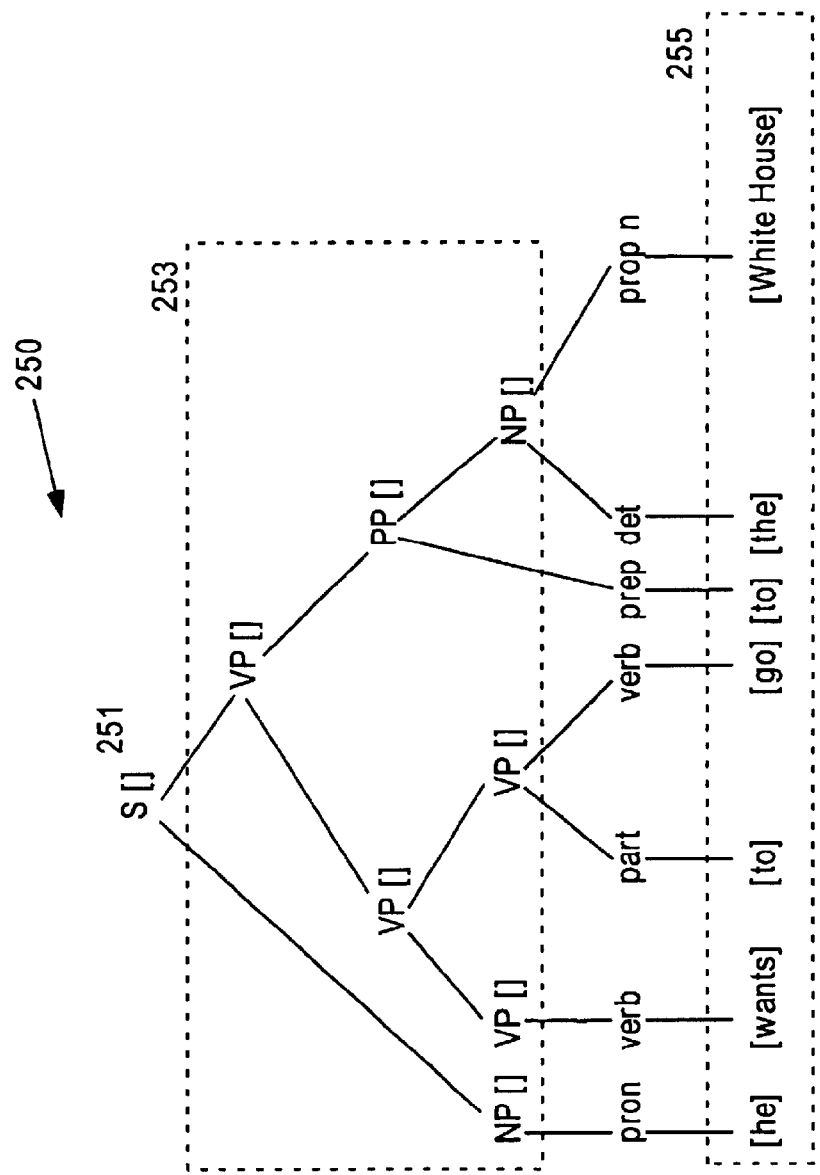

The feature structures chosen for the words by lexical ambiguity reduction module 210 are passed to syntactic analysis module 216. Syntactic analysis module 216 combines the chosen feature structures into a feature structure that represents the content of the input sentence. In one embodiment, syntactic analysis module 216 uses parsing grammar 212 to create a syntax parse tree for the sentence. Parsing grammar 212 contains the source language context-free grammar rules in the form of a parsing table and the associated rule bodies in executable code. Each leaf of the syntax parse tree is a feature structure for one of the words in the sentence. Once the leaves are created, an intermediate feature structure for each branch (parent) node in the syntax parse tree is built by combining its child nodes as specified in one or more of the context-free grammar rules. The rule body for each potentially applicable context-free grammar rule manipulates the various feature structures at the child nodes and determines whether the associated context-free rule could create a valid phrase from the possible combinations. A rule body may cause a thesaurus 214 to be queried as part of the manipulation. It will be appreciated that the feature structure that results from applying the context-free grammar rules may be nested (i.e., contain multiple feature structures from each child node). Syntactic analysis module 216 may create the syntax parse tree shown in FIG. 2*b* for the example sentence from its constituent feature structures, with the following feature structure at the top (root) of the syntax parse tree to represent the full sentence:

$$S \rightarrow \begin{bmatrix} \text{SUBJ} & \text{"he"} \\ \text{VERB} & \text{"wants to go"} \\ \text{OBJ} & \text{"to the White House"} \end{bmatrix} \quad \text{(Feature Structure 3)}$$

It will be appreciated that both the syntax parse tree 250 and the Feature Structure 3 are not exact representations but are simplified for purposes of ease in explanation.

The feature structure for the sentence in the source language is passed to transfer module 222. The feature structure represents the analysis of the source input and may contain a number of nested linguistic representations (referred herein as sub-structures or slots). Transfer module 222 uses transfer grammar 218 to match source language slots of the input with source language slots in example database 220. Example database 220 contains feature structure pairs in the source language and a target language. For example, database 220 may contain matching feature structures in English and Japanese. Transfer grammar 218 consists of a set of rewrite rules with a context-free component and a GPL rule body. The context-free parts of the rules are used to create a transfer generation tree.

Figure 2C:
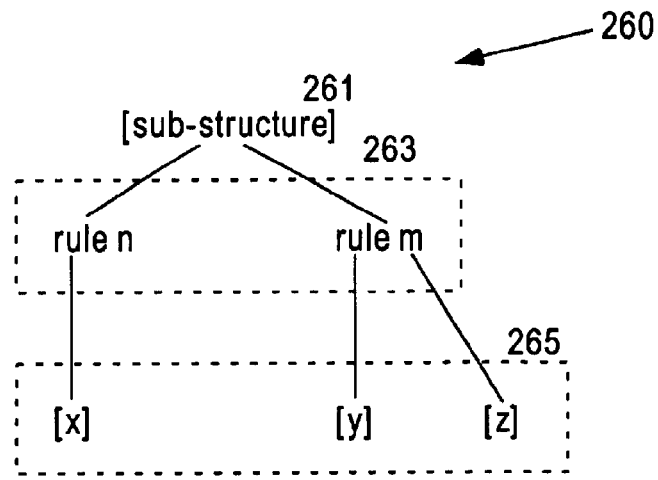

Transfer module 222 uses the GPL rule bodies within transfer grammar 218 to match the input source substructures or slots to the source sub-structures or slots in example database 220. If a good match is found (in one embodiment, a low overall match cost), transfer module 222 checks if all sub-structures or slots of the input feature structure have found a match. If a match for a sub-structure is not found, the sub-structure is used as input to transfer module 222. A transfer generation tree of the form shown in FIG. 2*c* is used to break the sub-structure into multiple sub-structures. The new input may be a part of the original, source feature structure or a new feature sub-structure that is constructed from sections of different slots.

Transfer module 222 uses the input feature structure (or sub-structure) in the source language as the starting symbol to build transfer generation tree 260. Root 261 is a symbol-node (s-node) and is labeled with the starting symbol of the feature structure. The transfer grammar determines which transfer grammar rules are applicable to the feature structure at the root 261, and creates child rule-node(s) (r-node) 263 depending from root 261. In one embodiment, r-nodes 263 are the rule numbers within transfer grammar 218 that may be validly applied to the input feature structure. Transfer grammar 218 rules added to tree 260 are applied to the s-nodes 265. If the application of each rule succeeds, a child rule-node (r-node) 265 is added to tree 260. If the application fails, the anode 261 is tagged as "dead" for sub-sequent removal. Transfer grammar 218 then creates a new s-node 265 for each r-node 263. Again, the applicable rules are found for each s-node 265 and applied. The process is repeated until all sub-features within the feature structure have been expanded. Transfer generation tree 260 is then pruned to remove any "dead" nodes and corresponding subtrees. If root 261 is tagged as "dead," the generation fails. Otherwise, the resulting transfer generation tree 260 is used by transfer module 222 to match the feature structure against the example database 220. The feature structures and sub-structures in the target language associated with a match are substituted for the corresponding feature structures and sub-structures matched in the source language. Transfer module 222 recursively applies the transfer rules contained within transfer grammar 218 from the top-most transfer rules until all meaningful sub-features or constituents within the input source feature structure are transferred to the target substructures. The transfer module 222 will consult the thesaurus 214 when required to do so by a transfer rule. Transfer module 222 outputs a feature structure in the target language.

Figure 2D:
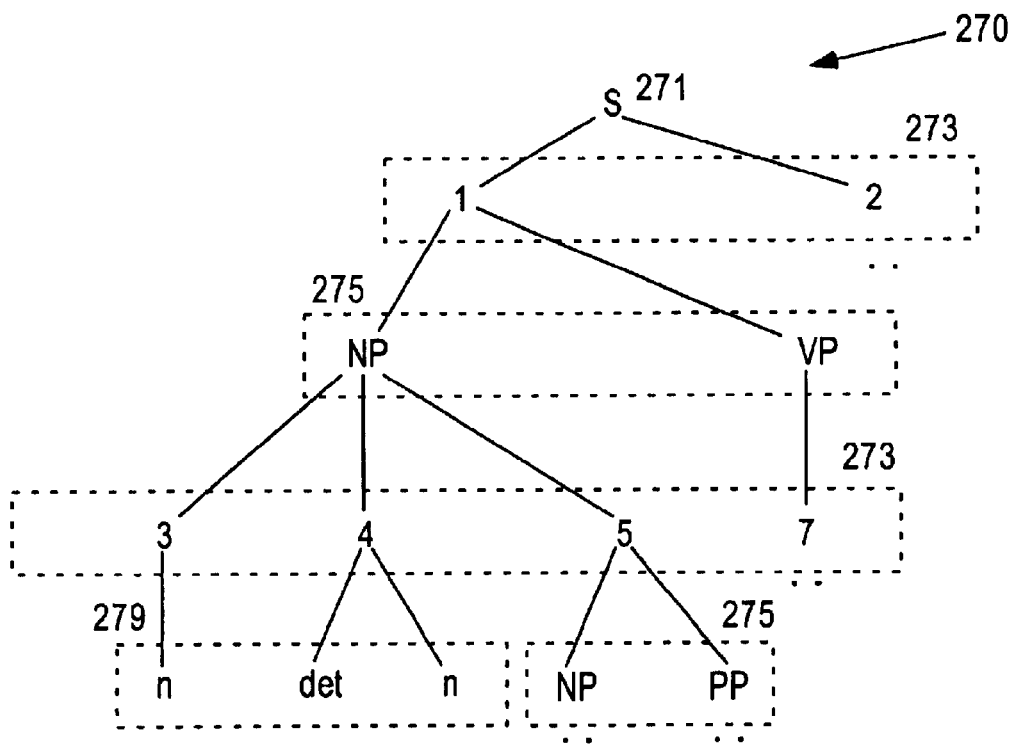

The feature structure for the sentence in the target language is passed to a morphological and syntactical generation module 228, where it is used as the root node for a syntactical generation tree, an example of which is shown in FIG. 2d. The syntactical generation tree is built in the same fashion as the transfer generation tree, with context-free rules in a generation grammar 224 as its r-nodes 273. The generation grammar 224 copies information to each s-node 275, 279. Unlike the transfer module 226, in which multiple sub-transfers created multiple transfer generation trees, only one syntactical generation tree is created by the morphological and syntactical generation module 228. Any s-node that is not a leaf node 279, i.e., associated with a feature structure for a word, is used to generate the next level of r-nodes. When all child s-nodes under an r-node are leaf nodes, the current branch of the tree is complete and the morphological and syntactical generation module 228 traverses back up the tree to find the next s-node that is not a leaf node. The thesaurus 214 is consulted when necessary during the generation of the tree. The transfer generation tree is complete when all the lowest level s-node are leaf nodes.

When the syntactical generation tree is complete, the leaf nodes contain output feature structures representing the words in one or more translations of the input sentence. The sequence of output feature structures that represents the best sentence is converted into output text 230 by the morphological and syntactical generation module 228 using the dictionary 226. Alternatively, all output feature structures for all sentences may be converted into the output text 230.

Figure 3A:
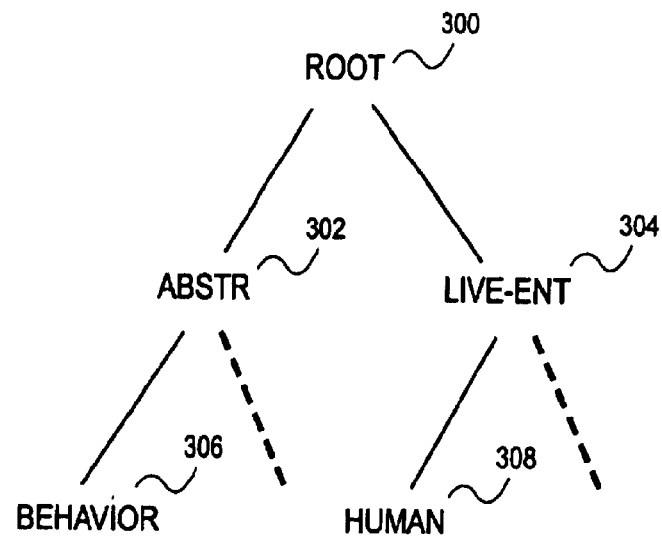
FIGS. 3a and 3b are exemplary diagrams of portions of a thesaurus hierarchy.
Figure 3B:
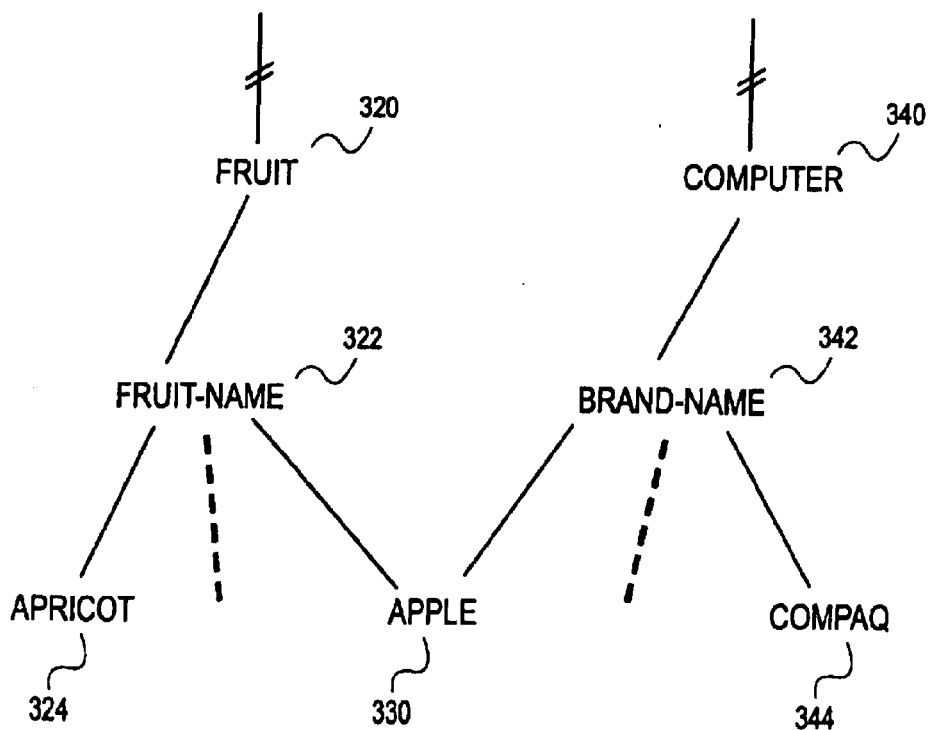

In FIGS. 3a and 3b, a database, such as thesaurus 214, comprises a structure having multiple entries, such as a top node 300, also known as "root" node, and several nodes 304 through 308 connected directly or indirectly to root node 300. The thesaurus structure encodes semantic "is-a" relationships between concepts residing within the thesaurus nodes. For example, FIG. 3b illustrates a portion of the thesaurus structure, wherein:

APPLE is-a FRUIT-NAME; and
APPLE is-a BRAND-NAME.

In one embodiment, the thesaurus structure is created manually, using a tool having a "user-friendly" graphic interface, such as data entry equipment. In alternate embodiments, other tools for creating the structure may also be used. The creation and further processing of the thesaurus structure will be described in more detail below.

In one embodiment, thesaurus 214 shown in FIG. 2a is created and processed within system 200. However, in alternate embodiments, thesaurus 214 may be created and processed off-line, that is prior to the processing of system 200. An operator inputs thesaurus concepts and relationships and organizes the concepts and relationships within the thesaurus structure, starting from root node 300. The thesaurus concepts reside within the nodes of the thesaurus, while branches between adjacent nodes represent the semantic "is-a" relationships between concepts.

As new thesaurus concepts become available and are input within the thesaurus structure, the structure may change due to changes in the relationships between concepts. After the concepts are entered, the thesaurus structure is exported for further processing using a thesaurus link file. The thesaurus link file is created by implementing the concepts residing within the nodes into a format, which contains a series of "is-a" statements, replacing the nodes and branches of the thesaurus structure. An example of a thesaurus link file may be illustrated as follows:

ABSTR is-a ROOT
ABSTR-PARTIT is-a QUANT-PARTIT
ACCESSORY is-a CLOTHING
ACCON is-a STRUCT
WINTER-EQUIP is-a SPORTS-EQUIP
WORK is-a FEATURE
WRAP is-a MOVE-ARTIF
WRITE-UTENS is-a UTENS

Figure 4:
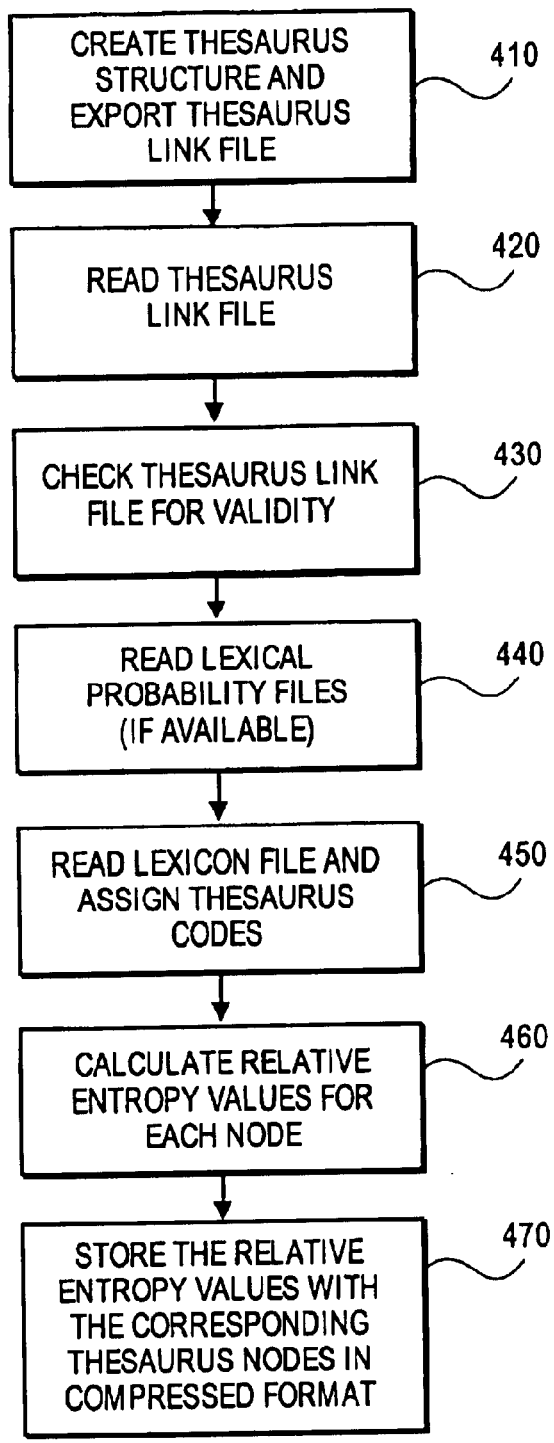
FIG. 4 is a flow diagram of one embodiment for creating a thesaurus structure.

In one embodiment, the creation of the database, such as thesaurus 214, includes creation of the multiple entries in the database, such as the nodes, and calculation of a relative entropy value corresponding to each entry. FIG. 4 is a flow diagram of one embodiment for creating the thesaurus structure and exporting the thesaurus link file. Referring to FIG. 4, initially at processing block 410, the thesaurus structure is created. At processing blocks 420 and 430, the thesaurus link file is read and a validity check of the semantic "is-a" relationships is performed. The validity check shown at processing block 430 includes several operations, such as, for example, a check for cycles and a check that every thesaurus concept has in fact a parent concept within the thesaurus structure. In alternate embodiments, other operations may be included in the validity check of the thesaurus link file.

At processing block 440, the lexical probability files are read, if available. The lexical probability files contain information about the probability of each word occurring in the domain of translation. If the lexical probability files are not available for reading and compiling, all words are assumed to occur with the same probability in the domain of translation.

At processing block 450, a lexicon database having multiple lexicon entries, containing elements, such as words, is read and possible thesaurus concepts associated with each lexicon entry are assigned. For example, the English noun lexicon entry for "apple" shown below:

((CAT NOUN)
(ROOT "apple")
(LEX-TYPE EXT)
(THES FRUIT-NAME BRAND-NAME APPLY)
(MAYFLOWER-INPUT+))

contains a thesaurus code THES FRUIT-NAME BRAND-NAME indicating possible semantic concepts for the word "apple". Similarly, lexicon entries in languages other than English contain thesaurus codes indicating respective semantic concepts for the words.

At processing block 460, scaled relative entropy values are calculated for each node of the thesaurus structure. Each node corresponding to a thesaurus concept has its own entropy value, Entropy (Node). The scaled relative entropy value corresponding to a node within the thesaurus structure is calculated using the formula:

$$RelativeEntropy(Node) = k * \frac{Entropy(Node)}{Entropy(RootNode)}$$

wherein Entropy (Root Node) is the entropy value corresponding to the root node and k is a constant factor. The entropy of a node, Entropy (Node), is further calculated based on all the words dominated by that node with the formula:

$$Entropy(Node) = - \sum_{wordsdominatedbyNode} p(word) \log p(word)$$

At processing block 470, after the scaled relative entropy value corresponding to each node in the thesaurus structure is calculated, that value is stored, together with the corresponding node, within the thesaurus structure. In one embodiment, the values and nodes are stored in a compressed format. The thesaurus 214 and its structure may now be used within system 200 for further evaluation of the feature structures.

Figure 5:
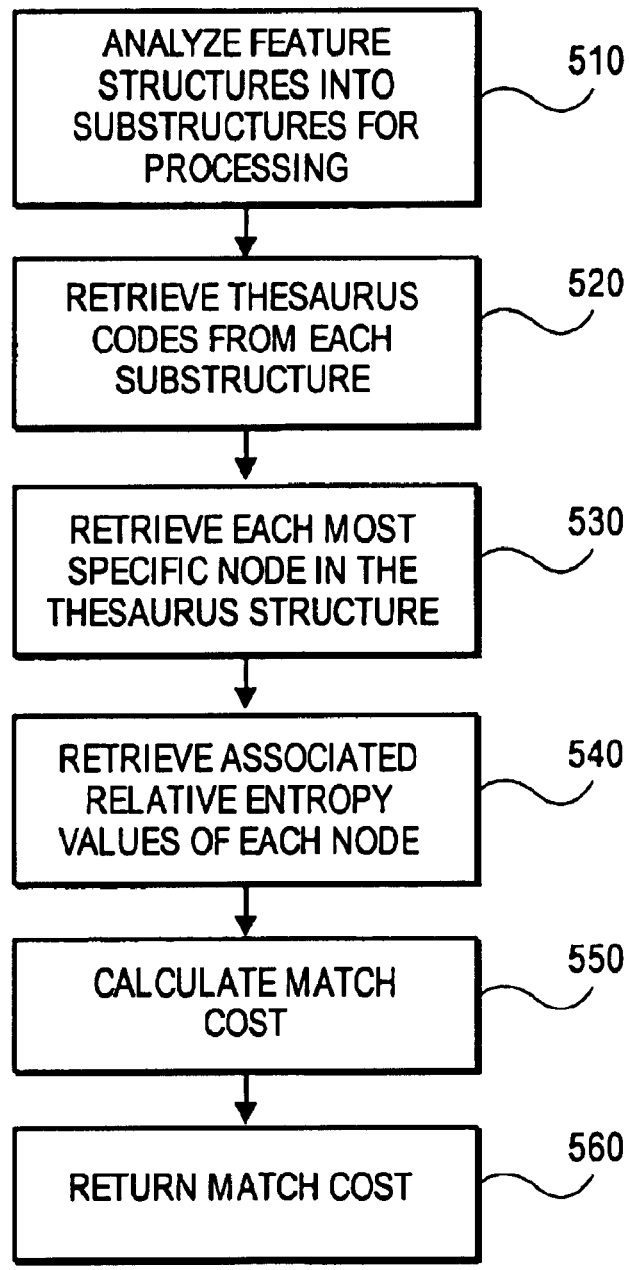
FIG. 5 is a flow diagram of one embodiment for evaluating similarity among structures.

FIG. 5 is a flow diagram of one embodiment for evaluating similarity between feature structures. At processing block 510, feature structures are received. In addition, the feature structures are analyzed into multiple substructures. At processing block 520, thesaurus codes THES ( . . . ) are retrieved from the substructures (in a prior procedure, the feature structures are compared to the lexicon entries within the lexicon database, and the thesaurus codes corresponding to the lexicon entries matching the feature structures are assigned to the feature structures and their substructures).

At processing block 530, the thesaurus codes are used to search the thesaurus structure for nodes matching each thesaurus code. In one embodiment, the search returns the most specific thesaurus node corresponding to each substructure. In one embodiment, the most specific thesaurus node is the lowest common parent that dominates the respective thesaurus code within the thesaurus concept structure.

At processing block 540, the relative entropy value corresponding to the most specific thesaurus node returned for each substructure is retrieved and sent to the syntactic analysis module 216. Finally, at processing block 550, a match cost value is calculated using the retrieved relative entropy values. In one embodiment, the match cost is calculated as a sum of the relative entropy values of each returned node and is returned to the system 200 at processing block 560. In alternate embodiments, other formulas may be used to calculate the match cost.

Figure 6:
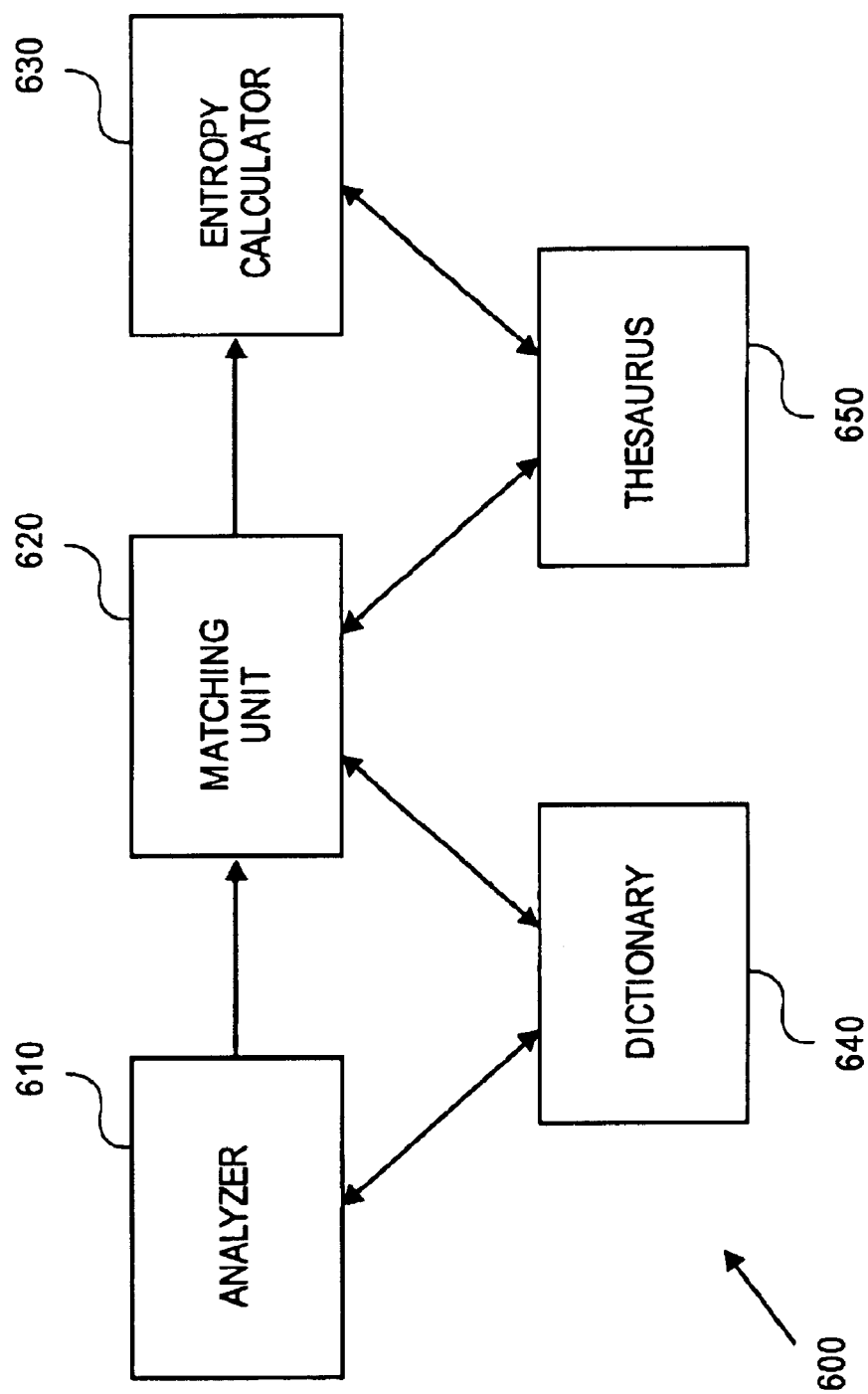
FIG. 6 is a block diagram of one embodiment of a thesaurus matching system.

A system for evaluating similarity among multiple data structures is further described in more detail. In FIG. 6, a thesaurus matching system 600 comprises analyzer 610, matching unit 620, entropy calculator 630, lexicon database 640, such as a dictionary, and database with multiple entries 650, such as a thesaurus structure.

Analyzer 610 receives feature structures and analyzes the structures into substructures for further processing. Matching unit 620 retrieves thesaurus codes from each substructure. Matching unit 620 also matches the retrieved thesaurus codes with nodes within the thesaurus structure, retrieving the most specific node corresponding to each substructure. Matching unit 620 retrieves an associated relative entropy value from thesaurus 650 corresponding to the most specific node of each substructure, sending the relative entropy values into entropy calculator 630. Entropy calculator 630 calculates a match cost value using the retrieved relative entropy values.

Thus, a system and method for evaluating similarity among a plurality of data structures has been provided. Although the present invention has been described with reference to specific exemplary embodiments, it will be evident that various modifications and changes may be made to these embodiments without departing from the broader spirit and scope of the invention as set forth in the claim. Accordingly, the specification and drawings are to be recorded in an illustrative rather that a restrictive sense.

What is claimed is:

1. A method for evaluating similarity among a plurality of data structures comprising:

analyzing each structure of said plurality of data structures to generate at least one substructure comprising a linguist feature-value pair;

matching said at least one substructure to a database having a plurality of entries to obtain at least one matching entry based on a semantic concept associated with said linguist feature-value pair, said database encoding relationships between semantic concepts represented by said plurality of entries, each semantic concept representing an "is-a" relationship between the entities; and generating a match value using a relative entropy value corresponding to said at least one matching entry, said relative entropy value being calculated relative to an entropy value of a root entry of said plurality of entries.

2. The method according to claim 1, further comprising:

creating said plurality of entries in said database; and processing said plurality of entries in said database.

3. The method according to claim 2, wherein said creating further comprises creating said plurality of entries using a tool having a graphical user interface and exporting said plurality of entries to said database.

4. The method according to claim 2, wherein said processing further comprises:

verifying said plurality of entries for validity; and calculating said relative entropy value corresponding to each entry of said plurality of entries.

5. The method according to claim 4, wherein said processing further comprises storing said each entry of said plurality of entries together with said corresponding relative entropy value in a compressed format.

6. The method according to claim 1, further comprising extracting from a lexicon database having a plurality of elements each element associated to said each structure, assigning at least one code of said each element to said each structure, and retrieving said at least one code during matching to obtain said at least one matching entry.

7. The method according to claim 6, further comprising reading lexical probability files and assigning a probability value to said each element of said plurality of elements in said lexicon database.

8. The method according to claim 1, wherein each structure of said plurality of data structures is a representation of a linguistic expression.

9. The method according to claim 4, wherein said database is a thesaurus hierarchy including said root entry, said plurality of entries depending from said root entry.

10. The method according to claim 9, wherein said relative entropy value corresponding to said each entry of said plurality of entries is calculated based on an entropy value of said each entry and an entropy value of said root entry.

11. The method according to claim 6, wherein said each element in said lexicon database is a word.

12. A method for evaluating similarity among a plurality of data structures comprising:
creating a plurality of entries in a database for subsequent comparison with linguist feature-value pairs based on semantic concepts associated with said linguist feature-value pairs, said database encoding relationships between semantic concepts represented by said plurality of entries, each semantic concept representing an "is-a" relationship between the entities; and
calculating a relative entropy value corresponding to each entry of said plurality of entries, said relative entropy value being calculated relative to an entropy value of a root entry of said plurality of entries.

13. The method according to claim 12, further comprising storing said each entry of said plurality of entries together with said corresponding relative entropy value in a compressed format.

14. The method according to claim 12, further comprising:
creating said plurality of entries using a tool having a graphical user interface; and
exporting said plurality of entries to said database.

15. The method according to claim 12 further comprising:
analyzing each structure of said plurality of data structures to generate at least one substructure;
matching said at least one substructure of said each structure to said database to obtain at least one matching entry; and
generating a match value using said relative entropy value corresponding to said at least one matching entry.

16. The method according to claim 15, further comprising:
verifying said plurality of entries for validity;
extracting from a lexicon database having a plurality of elements each element associated to said each structure;
reading lexical probability files;
assigning a probability value to said each element of said plurality of elements in said lexicon database;
assigning at least one code of said each element to said each structure; and
retrieving and matching said at least one code to database to obtain said at least one matching entry.

17. The method according to claim 16, wherein said each structure of said plurality of data structures is a representation of a linguistic expression.

18. The method according to claim 12, wherein said database is a thesaurus hierarchy including said root entry, said plurality of entries depending from said root entry.

19. The method according to claim 18, wherein said relative entropy value corresponding to said each entry of said plurality of entries is calculated based on an entropy value for said each entry and an entropy value for said root entry.

20. The method according to claim 15, wherein said each element in said lexicon database is a word.

21. A computer readable medium containing executable instructions which, when executed in a processing system, cause the system to perform a method for evaluating similarity among a plurality of data structures, the method comprising:
analyzing each structure of said plurality of data structures to generate at least one substructure comprising a linguist feature-value pair;
matching said at least one substructure to a database having a plurality of entries to obtain at least one matching entry based on a semantic concept associated with said linguist feature-value pair, said database encoding relationships between semantic concepts represented by said plurality of entries, each semantic concept representing an "is-a" relationship between the entities; and
generating a match value using a relative entropy value corresponding to said at least one matching entry, said relative entropy value being calculated relative to an entropy value of a root entry of said plurality of entries.

22. The computer readable medium according to claim 21, wherein the method further comprises:
creating said plurality of entries in said database; and
processing said plurality of entries in said database.

23. The computer readable medium according to claim 22, wherein said creating further comprises creating said plurality of entries using a tool having a graphical user interface and exporting said plurality of entries to said database.

24. The computer readable medium according to claim 22, wherein said processing further comprises:
verifying said plurality of entries for validity; and
calculating said relative entropy value corresponding to each entry of said plurality of entries.

25. The computer readable medium according to claim 24, wherein said processing further comprises storing said each entry of said plurality of entries together with said corresponding relative entropy value in a compressed format.

26. The computer readable medium according to claim 21, further comprising extracting from a lexicon database having a plurality of elements each element associated to said each structure, assigning at least one code of said each element to said each structure, and retrieving said at least one code during matching to obtain said at least one matching entry.

27. The computer readable medium according to claim 26, further comprising reading lexical probability files and assigning a probability value to said each element of said plurality of elements in said lexicon database.

28. The computer readable medium according to claim 21, wherein each structure of said plurality of data structures is a representation of a linguistic expression.

29. The computer readable medium according to claim 24, wherein said database is a thesaurus hierarchy including said root entry, said plurality of entries depending from said root entry.

30. The computer readable medium according to claim 29, wherein said relative entropy value corresponding to said each entry of said plurality of entries is calculated based on an entropy value of said each entry and an entropy value of said root entry.

31. The computer readable medium according to claim 26, wherein said each element in said lexicon database is a word.

32. A computer readable medium containing executable instructions which, when executed in a processing system, cause the system to perform a method for evaluating similarity among a plurality of data structures, the method comprising:
 creating a plurality of entries in a database for subsequent comparison with linguist feature-value pairs based on semantic concepts associated with said linguist feature-value pairs, said database encoding relationships between semantic concepts represented by said plurality of entries, each semantic concept representing an "is-a" relationship between the entities; and
 calculating a relative entropy value corresponding to each entry of said plurality of entries, said relative entropy value being calculated relative to an entropy value of a root entry of said plurality of entries.

33. The computer readable medium according to claim 32, further comprising storing said each entry of said plurality of entries together with said corresponding relative entropy value in a compressed format.

34. The computer readable medium according to claim 32, further comprising:
 creating said plurality of entries using a tool having a graphical user interface; and
 exporting said plurality of entries to said database.

35. The computer readable medium according to claim 32 further comprising:
 analyzing each structure of said plurality of data structures to generate at least one substructure;
 matching said at least one substructure of said each structure to said database to obtain at least one matching entry; and
 generating a match value using said relative entropy value corresponding to said at least one matching entry.

36. The computer readable medium according to claim 35, further comprising:
 verifying said plurality of entries for validity;
 extracting from a lexicon database having a plurality of elements each element associated to said each structure;
 reading lexical probability files;
 assigning a probability value to said each element of said plurality of elements in said lexicon database;
 assigning at least one code of said each element to said each structure; and
 retrieving and matching said at least one code to said database to obtain said at least one matching entry.

37. The computer readable medium according to claim 36, wherein said each structure of said plurality of data structures is a representation of a linguistic expression.

38. The computer readable medium according to claim 32, wherein said database is a thesaurus hierarchy including said root entry, said plurality of entries depending from said root entry.

39. The computer readable medium according to claim 38, wherein said relative entropy value corresponding to each entry of said plurality of entries is calculated based on an entropy value for said each entry and an entropy value for said root entry.

40. The computer readable medium according to claim 35, wherein said each element in said lexicon database is a word.

41. An article of manufacture comprising a program storage medium readable by a computer and tangibly embodying at least one program of instructions executable by said computer to perform method steps for evaluating similarity among a plurality of data structures, said method comprising:
 analyzing each structure of said plurality of data structures to generate at least one substructure comprising a linguist feature-value pair;
 matching said at least one substructure to a database having a plurality of entries to obtain at least one matching entry based on a semantic concept associated with said linguist feature-value pair, said database encoding relationships between semantic concepts represented by said plurality of entries, each semantic concept representing an "is-a" relationship between the entities; and
 generating a match value using a relative entropy value corresponding to said at least one matching entry, said relative entropy value being calculated relative to an entropy value of a root entry of said plurality of entries.

42. The article of manufacture according to claim 41, wherein the method further comprises:
 creating said plurality of entries in said database; and
 processing said plurality of entries in said database.

43. The article of manufacture according to claim 42, wherein said creating further comprises creating said plurality of entries using a tool having a graphical user interface and exporting said plurality of entries to said database.

44. The article of manufacture according to claim 42, wherein said processing further comprises:
 verifying said plurality of entries for validity; and
 calculating said relative entropy value corresponding to each entry of said plurality of entries.

45. The article of manufacture according to claim 44, wherein said processing further comprises storing each entry of said plurality of entries together with said corresponding relative entropy value in a compressed format.

46. The article of manufacture according to claim 41, wherein the method further comprises:
 extracting from a lexicon database having a plurality of elements each element associated to said each structure;
 assigning at least one code of said each element to said each structure; and
 retrieving said at least one during matching to obtain said at least one matching entry.

47. The article of manufacture according to claim 46, wherein the method further comprises reading lexical probability files and assigning a probability value to said each element of said plurality of elements in said lexicon database.

48. The article of manufacture according to claim 41, wherein each structure of said plurality of data structures is a representation of a linguistic expression.

49. The article of manufacture according to claim 44, wherein said database is a thesaurus hierarchy including said root entry, said plurality of entries depending from said root entry.

50. The article of manufacture according to claim 49, wherein said relative entropy value corresponding to said each entry of said plurality of entries is calculated based on an entropy value of said each entry and an entropy value of said root entry.

51. The article of manufacture according to claim 46, wherein said each element in said lexicon database is a word.

52. An article of manufacture comprising a program storage medium readable by a computer and tangibly embodying at least one program of instructions executable by said computer to perform method steps for evaluating similarity among a plurality of data structures, said method comprising:

creating a plurality of entries in a database for subsequent comparison with linguist feature-value pairs based on semantic concepts associated with said linguist feature-value pairs, said database encoding relationships between semantic concepts represented by said plurality of entries, each semantic concept representing an "is-a" relationship between the entities; and calculating a relative entropy value corresponding to each entry of said plurality of entries, said relative entropy value being calculated relative to an entropy value of a root entry of said plurality of entries.

53. The article of manufacture according to claim 52, wherein the method further comprises storing said each entry of said plurality of entries together with said corresponding relative entropy value in a compressed format.

54. The article of manufacture according to claim 52, wherein the method further comprises:

creating said plurality of entries using a tool having a graphical user interface; and exporting said plurality of entries to said database.

55. The article of manufacture according to claim 52, wherein the method further comprises:

analyzing each structure of said plurality of data structures to generate at least one substructure;

matching said at least one substructure of said each structure to said database to obtain at least one matching entry; and generating a match value using said relative entropy value corresponding to said at least one matching entry.

56. The article of manufacture according to claim 55, wherein the method further comprises:

verifying said plurality of entries for validity;

extracting from a lexicon database having a plurality of elements each element associated to said each structure;

reading lexical probability files;

assigning a probability value to said each element of said plurality of elements in said lexicon database;

assigning at least one code of said each element to said each structure; and retrieving and matching said at least one code to said database to obtain said at least one matching entry.

57. The article of manufacture according to claim 56, wherein said structure of said plurality of data structures is a representation of an linguistic expression.

58. The article of manufacture according to claim 52, wherein said database is a thesaurus hierarchy including said root entry, said plurality of entries depending from said root entry.

59. The article of manufacture according to a claim 58, wherein said relative entropy value corresponding to said each entry of said plurality of entries is calculated based on an entropy value for said each entry and an entropy value for said root entry.

60. The article of manufacture according to claim 55, wherein said each element in said lexicon database is a word.

61. A system for evaluating similarity among a plurality of data structures, comprising:

means for analyzing each structure of said plurality of data structures to generate at least one substructure comprising a linguist feature-value pair;

means for matching said at least one substructure to a database having a plurality of entries to obtain at least one matching entry based on a semantic concept associated with said linguist feature-value pair, said database encoding relationships between semantic concepts represented by said plurality of entries, each semantic concept representing an "is-a" relationship between the entities; and means for generating a match value using a relative entropy value corresponding to said at least one matching entry, said relative entropy value being calculated relative to an entropy value of a root entry of said plurality of entries.

62. The system according to claim 61, further comprising:

means for creating said plurality of entries in said database; and means for processing said plurality of entries in said database.

63. The system according to claim 62, wherein said creating means further comprises means for creating said plurality of entries using a tool having a graphical user interface and exporting said plurality of entries to said database.

64. The system according to claim 62, wherein said processing means further comprises:

means for verifying said plurality of entries for validity; and means for calculating said relative entropy value corresponding to each entry of said plurality of entries.

65. The system according to claim 64, wherein said processing means further comprises means for storing said each entry of said plurality of entries together with said corresponding relative entropy value in a compressed format.

66. The system according to claim 61, further comprising:

means for extracting from a lexicon database having a plurality of elements each element associated to said each structure;

means for assigning at least one code of said each element to said each structure; and means for retrieving said at least one code during matching to obtain said at least one matching entry.

67. The system according to claim 66, further comprising:

means for reading lexical probability files; and means for assigning a probability value to said each element of said plurality of elements in said lexicon database.

68. The system according to claim 61, wherein each structure of said plurality of data structures is a representation of a linguistic expression.

69. The system according to claim 64, wherein said database is a thesaurus hierarchy including said root entry, said plurality of entries depending from said root entry.

70. The system according to claim 69, wherein said relative entropy value corresponding to said each entry of said plurality of entries is calculated based on an entropy value of said each entry and an entropy value of said root entry.

71. The system according to claim 66, wherein said each element in said lexicon database is a word.

72. A system for evaluating similarity among a plurality of data structures, comprising:
   means for creating a plurality of entries in a database for subsequent comparison with linguist feature-value pairs based on semantic concepts associated with said linguist feature-value pairs, said database encoding relationships between semantic concepts represented by said plurality of entries, each semantic concept representing an "is-a" relationship between the entities; and
   means for calculating a relative entropy value corresponding to each entry of said plurality of entries, said relative entropy value being calculated relative to an entropy value of a root entry of said plurality of entries.

73. The system according to claim 72, further comprising means for storing said each entry of said plurality of entries together with said corresponding relative entropy value in a compressed format.

74. The system according to claim 72, further comprising:
   means for creating said plurality of entries using a tool having a graphical user interface; and
   means for exporting said plurality of entries to said database.

75. The system according to claim 72, further comprising:
   means for analyzing each structure of said plurality of data structures to generate at lease one substructure;
   means for matching said at least one substructure of said each structure to said database to obtain at least one matching entry; and
   means for generating a match value using said relative entropy value corresponding to said at least one matching entry.

76. The system according to claim 75, further comprising:
   means for verifying said plurality of entries for validity;
   means for extracting from a lexicon database having a plurality of elements each element associated to said each structure;
   means for reading lexical probability files;
   means for assigning a probability value to said each element of said plurality of elements in said lexicon database;
   means for assigning at least one code of said each element to said each structure; and
   means for retrieving and matching said at least one code to said database to obtain said at least one matching entry.

77. The system according to claim 76, wherein said each structure of said plurality of data structures is a representation of a linguistic expression.

78. The system according to claim 72, wherein said database is a thesaurus hierarchy including said root entry, said plurality of entries depending from said root entry.

79. The system according to claim 78, wherein said relative entropy value corresponding to said each entry of said plurality of entries is calculated based on an entropy value for said each entry and an entropy value for said root entry.

80. The system according to claim 75, wherein said each element in said lexicon database is a word.

81. A system for evaluating similarity among a plurality of data structures, comprising:
   a database having a plurality of entries, said database encoding relationships between semantic concepts represented by said plurality of entries;
   an analyzer, coupled to said database, said analyzer configured to analyze each structure of said plurality of data structure to generate at least one substructure comprising a linguist feature-value pair;
   a matching unit, coupled to said analyzer and said database, said matching unit configured to match said at least one substructure to at least one entry of said plurality of entries to obtain at least one matching entry based on a semantic concept associated with said linguist feature-value pair, each semantic concept representing an "is-a" relationship between the entities; and
   an entropy calculator, coupled to said matching unit and said database, configured to generate a match value using a relative entropy value corresponding to said at least one matching entry, said relative entropy value being calculated relative to an entropy value of a root entry of said plurality of entries.

82. The system according to claim 81, wherein, said plurality of entries are created offline using a tool having a graphical user interface and are exported to said database.

83. The system according to claim 81, wherein said entropy calculator further calculates said relative entropy value corresponding to each entry of said plurality of entries.

84. The system according to claim 83, wherein said database stores said each entry together with said corresponding relative entropy value in a compressed format.

85. The system according to claim 81, wherein said matching unit further retrieves at least one code from said at least one substructure and matches said at least one code to said at least one entry to obtain said at least one matching entry.

86. The system according to claim 81, wherein each structure of said plurality of data structure is a representation of a linguistic expression.

87. The system according to claim 81, wherein said database is a thesaurus hierarchy including said root entry, said plurality of entries depending from said root entry.

88. The system according to claim 87, wherein said relative entropy value corresponding to said each entry of said plurality of entries is calculated based on an entropy values of said entry and an entropy value of said root entry.

* * * * *